United States Patent [19]

Chew

[11] Patent Number: 4,763,875

[45] Date of Patent: Aug. 16, 1988

[54] PNEUMATIC COUPLING HAVING A LATCHING MECHANISM AND A BLEED-OFF VALVE FOR ATTACHMENT TO AN AIR BRAKE HOSE

[75] Inventor: James P. Chew, Jeannette, Pa.

[73] Assignee: American Standard Inc., North Hills, Pa.

[21] Appl. No.: 82,401

[22] Filed: Aug. 6, 1987

[51] Int. Cl.$^4$ .............................................. F16L 37/28
[52] U.S. Cl. ............................ 251/149.9; 285/87; 303/47; 303/86; 213/75 R; 246/169 R
[58] Field of Search ............... 285/87, 88, 93, 924; 303/47, 86; 213/75 R; 246/169 R; 251/89.5, 149.9

[56] References Cited

U.S. PATENT DOCUMENTS

| | | | |
|---|---|---|---|
| 1,106,431 | 8/1914 | Westinghouse | 246/169 R |
| 1,404,102 | 1/1922 | Dubois | 303/47 |
| 1,770,570 | 7/1930 | Costello | 285/87 |
| 1,790,186 | 1/1931 | Whtaker | 251/89.5 |
| 2,121,774 | 6/1938 | Ham | 303/86 |
| 3,215,456 | 11/1965 | Schmid | 285/87 |
| 4,125,279 | 11/1978 | Scott | 285/69 |
| 4,129,323 | 12/1978 | Wilson | 285/69 |
| 4,487,060 | 11/1984 | Pomeroy | 246/169 R |
| 4,520,662 | 6/1985 | Schmid | 213/75 R |
| 4,641,892 | 2/1987 | Schmid | 303/47 |

*Primary Examiner*—A. Michael Chambers
*Attorney, Agent, or Firm*—J. B. Sotak

[57] ABSTRACT

A brake hose coupling having a locking mechanism and a pressure relief valve for connecting a telemetry unit to the air brake pipe line of a railway train. The locking mechanism positively latches the brake hose coupling to the "glad hand" brake pipe hose coupling and causes the venting of the entrapped pneumatic pressure by the relief valve when the locking mechanism is unlatched.

10 Claims, 2 Drawing Sheets

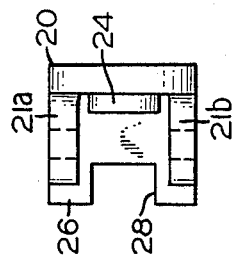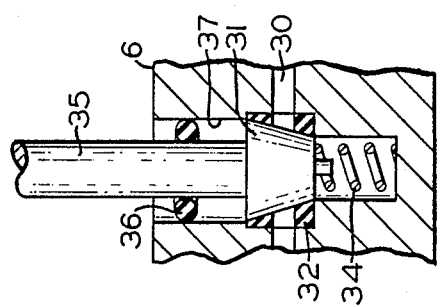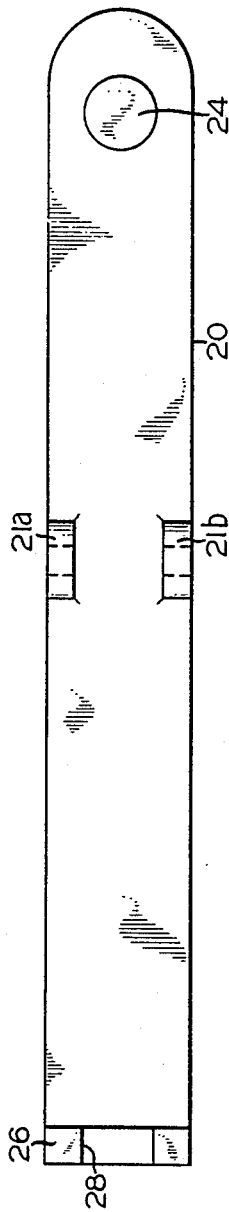

PNEUMATIC COUPLING HAVING A LATCHING MECHANISM AND A BLEED-OFF VALVE FOR ATTACHMENT TO AN AIR BRAKE HOSE

FIELD OF THE INVENTION

This invention relates to a lockable "glad hand" coupling for safely allowing a pressurized air brake hose of a railway vehicle to be quickly vented to atmosphere and more particularly to a modified "glad hand" coupling having a latching mechanism for lockably attaching an air hose of a telemetry unit to a "glad hand" connector of an air brake hose and having a relief valve for exhausting the pneumatic pressure to atmosphere prior to unlocking the latching mechanism for disconnecting the coupling from the "glad hand" connector.

BACKGROUND OF THE INVENTION

In a conventional railroad train braking system, each railway vehicle is provided with a brake pipe line which extends along the length of the vehicle. The pipe line is connected to the brake cylinders via the service and emergency reservoirs and various valves. Each end of the brake pipe is coupled to a "glad hand" connector by an angle or stop cock and a flexible hose. During the make-up of a train, the "glad hand" connectors are fastened together to form a continuous pipe line which extends from the head locomotive to the last vehicle of the train. The locomotive carries an air compressor or a source of compressed air that is conveyed to the brake line through various valves which include one or more master control valves which are in easy reach of the locomotive engineer.

Now when a train is made up and the "glad hand" connectors of each vehicle are interconnected to each other, the angle or stock cock on the tail end of the last vehicle is closed while the remaining cocks are opened. Thus, a continuous closed brake pipe line is formed from the foremost locomotive to the rearmost vehicle. The brake pipe is pressurized or charged from the air compressor on the locomotive to a predetermined pressure level, such as, 90 psi, for freight operation. The predetermined pressure in the brake line causes the pistons in the brake cylinders to be withdrawn on each railway vehicle so that the brakes are released and results in charging of the respective reservoirs.

Now when it is necessary or desirable to initiate a brake application, the engineer in the lead locomotive cuts power and actuates the master control valves which causes a reduction in the pressure in the brake pipe which is sensed by the control valve carried by each vehicle. When the differential pressure between the reservoir and the brake pipe exceeds a predetermined amount, the control valve causes the piston of the brake cylinder to extend and apply the brakes in proportion to the magnitude of the differential pressure. When a brake release is desired, the engineer actuates the master control valve in the locomotive cab to cause the build up of pressure in the brake pipe line to the full release value, namely, 90 psi, or to some intermediate pressure level if a partial brake release is appropriate.

Further, the advent of cabooseless trains now requires that the brake pressure in the last vehicle of the train be constantly measured and checked to insure safe operation. The removal of cabooses from the tail ends of the freight trains has generated a need for equipment which is capable of sensing and monitoring the brake line pressure and the presence of the last vehicle. In actual practice, the equipment includes the electronics, the radio transmitter, the battery supply and the pressure transducer which are all housed within an appropriate protective casing. It has been found that one of the most practical locations for mounting the equipment casing is on the end coupler of the last vehicle since the "glad hand" connector of the brake pipe hose is readily available for measuring the existing air pressure. It will be appreciated that the coupler of the last vehicle is obviously the end-of-train and that the equipment is somewhat protected by the body of the vehicle against the harsh environment of railroading. The monitoring equipment is coupled to the "glad hand" connector via a coupling and a flexible hose. The conventional "glad hand" coupling at the end of the brake pipe hose of a railway vehicle will provide a secure connection resistant to excessive leakage only when it is connected to another "glad hand" equipped with a mating gasket. Also, these "glad hand" couplings are so constructed that, whenever two "glad hand" couplings between adjacent vehicles are connected, the weight of the brake pipe hoses maintains a relative alignment between the connected "glad hand" couplings so as to make the connection resistant to accidental separation due to vibration or shock. As a conventional "glad hand" coupling and brake pipe hose are too heavy and unwieldy for use with monitoring equipment, it is desirable to use a special hose coupling incorporating a standard brake pipe hose coupling gasket, as well as a latching mechanism to prevent the accidental separation of the monitoring equipment hose coupling from the vehicle brake pipe hose coupling. In order to safely disconnect the pressurized coupling from the brake pipe hose connector, it is desirable to bleed off the trapped air pressure before disconnection.

OBJECTS AND SUMMARY OF THE INVENTION

Accordingly, it is an object of this invention to provide a lockable "glad hand" coupling including a pressure relief valve.

A further object of this invention is to provide a novel pneumatic coupling having a latching mechanism and a bleed-off valve for attachment to a brake hose of a railway vehicle.

Another object of this invention is to provide a new brake hose coupling having a mechanical latch and a pneumatic vent valve.

Yet a further object of this invention is to provide a latchable "glad hand" coupling device having an air vent valve for bleeding a railway brake hose.

Still another object of this invention is to provide a new brake hose coupling having both a mechanical latch and a pneumatic vent valve, both of these features being arranged in such a way that, whenever the coupling is joined with a conventional brake pipe hose coupling, any pressure existing within both couplings must be vented before the couplings can be separated.

Yet another object of this invention is to provide an improved brake hose coupling for connection to a conventional brake pipe hose coupling comprising a body member having a cavity, the cavity having an opening for receiving a sealing gasket, a threaded opening for receiving an end of an air hose which supplies air pressure to telemetry equipment, the body member having a through passage leading from the cavity to atmosphere, a bleed-off valve interposed in the through passage, a pivoted locking member carried by the body member and being spring-biased toward a locked position in which the locking member is latched to the conventional brake pipe hose coupling and causes the bleed-off valve to vent the air pressure to atmosphere when the locking member is moved to an unlocked position.

Still a further object of this invention is to provide a new and unique railroad brake pipe coupling which is economical in cost, efficient in operation, reliable in service, and durable in use.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 2 is an enlarged fragmentary vertical sectional view of the bleed-off valve of FIG. 1.

FIG. 3 is a bottom plane view of the pivotal locking lever member of FIG. 1.

FIG. 4 is an end elevational view of the pivotal locking lever member of FIG. 3.

DETAILED DESCRIPTION OF THE INVENTION

Figure 1:
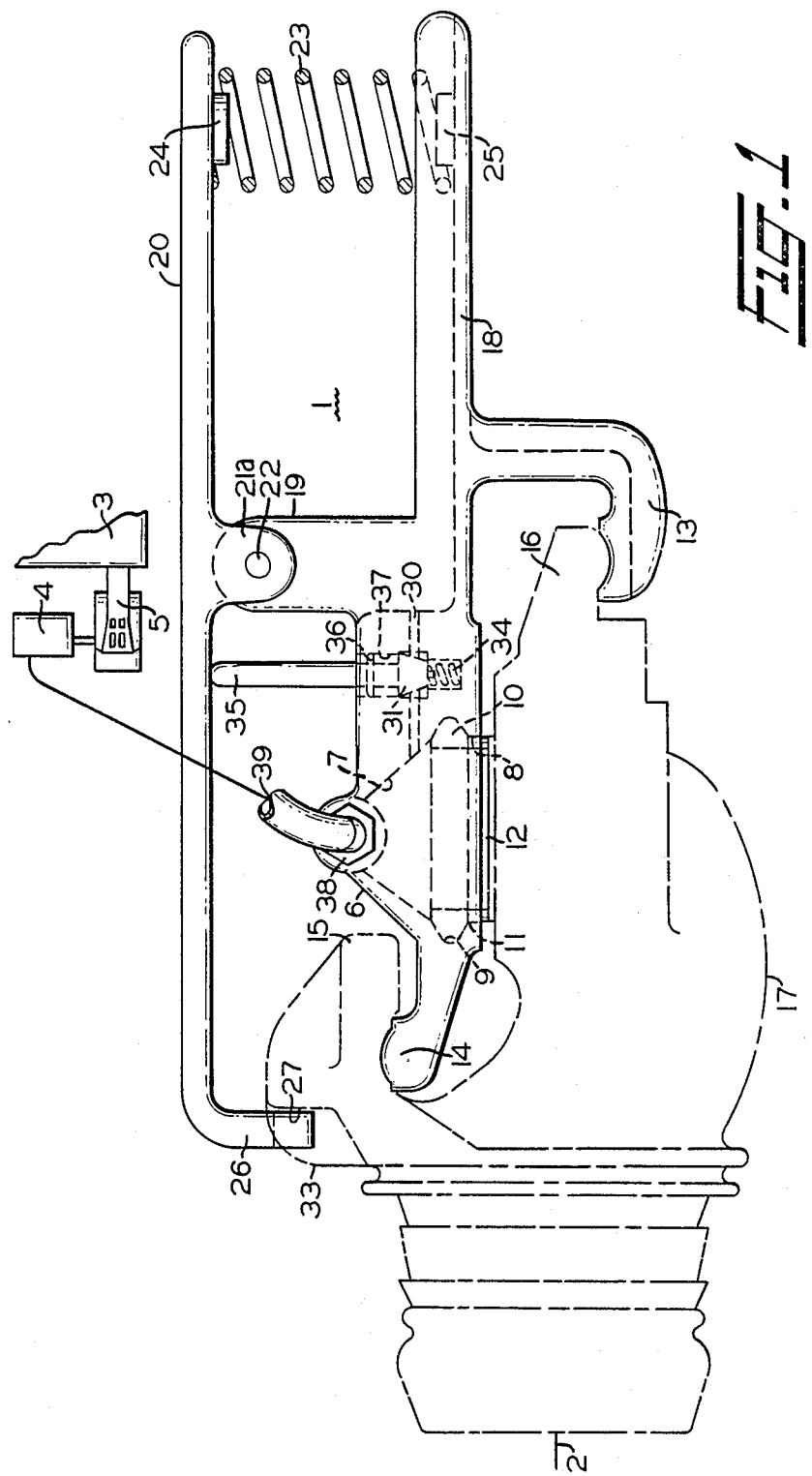
FIG. 1 is a side elevational view of the lockable and venting type of "glad hand" brake hose coupling and conventional brake pipe hose coupling, shown in phantom, in which a telemetry unit is mounted to the coupler of the last vehicle of a railway train.

Referring now to the drawings, and in particular to FIG. 1, there is shown a brake hose coupling or connector generally characterized by numeral 1, which is adapted to connect the brake pipe hose 2 of a railway vehicle 3 to a telemetry unit or pressure monitoring equipment 4 carried by the last coupler 5 of a train. That is, whenever an end-of-train or rear-of-train telemetry unit 4 that transmits data concerning brake pipe pressure, is attached to the last car 3 of a train, it is necessary to connect the telemetry unit 4 to the brake pipe hose 2. A standard or conventional brake pipe hose coupling, commonly known as a "glad hand," is unwieldy to use due to the need of a bulky hose. However, the most reliable and leakproof brake pipe hose connection to a "glad hand" is made with another "glad hand." It has been found that other types of connectors used to connect the telemetry unit to the "glad hand" coupling of the brake pipe hose comprises the reliability of the pneumatic connection.

As shown, the brake hose coupling 1 includes a metallic body member 6 which may be either sand cast or investment cast to provide the strength and toughness that is necessary in a railroad environment. The body member 6 includes an internal cavity 7 which has an enlarged opening 8 formed on the lower end, as viewed in FIG. 1. The cavity 7 includes an annular groove 9 which accommodates the annular bead portion 10 of a standard "glad hand" rubber sealing gasket 11 which has a portion 12 extending slightly beyond the lower surface of member 6. The body member 6 also includes locking flanges 13 and 14 which match the usual locking flanges 15 and 16 of a conventional "glad hand" brake pipe hose coupling 17. The metal body 6 also includes an elongated handle 18 and an upstanding stanchion portion 19 for accommodating a pivotal locking lever member 20. The locking member 20 includes a pair of intermediate apertured depending tabs 21a and 21b, as shown in FIGS. 1, 3, and 4. As shown in FIG. 1, the locking member is pivoted about pin 22 and is biased in a counterclockwise direction by a helical compression spring 23 which is trapped between the outer extremities of handle 18 and pivoted locking member 20 by spring retaining buttons 24 and 25. It will be seen that, at the end remote from the spring end, there is provided a depending locking tab or leg 26 which engages and either cooperates with a reinforcing rib 27 or is nestled between two lateral ribs 33, either feature being formed on the guard arm 15 of the conventional "glad hand" brake pipe hose coupling 17. A central slot 28 is provided in the locking tab 26 to be compatible with conventional couplings having a center dividing reinforcing rib and thereby averts any tendency to turning or twisting.

As shown in FIG. 1, a through passageway 30 is formed in the metal body 6. The through passageway 30 leads from the cavity 7 to the outside milieu or atmosphere. It will be seen that a relief or bleed-off valve 31 is located intermediate the ends of the fluid passageway 30. The valve 31 cooperates with the soft or rubber valve seat 32 which is a cylindrically-shaped pliable member, as shown in FIG. 2. A spiral compression spring 34 urges the valve 31 toward an open position. A plunger or valve stem 35 is cooperatively associated with the valve 31 and extends externally from the body 6. A sealing O-ring 36 surrounds the stem 35 and communicates with surface wall of the exit hole 37. The O-ring prevents air leakage and acts as a guide for the stem 35. It will be seen that the tip or extreme end of the stem 35 is in engagement with the underside of the pivotal lever member 20 so that the valve 31 is in its closed position when the brake hose coupling 1 is in its locked position. The upper end of the cavity 7 is provided with a threaded opening or bore hole (not characterized) for receiving the threaded fitting 38 of the flexible air hose 39 which leads and is suitably connected to the telemetry unit 4 for monitoring the air pressure in the brake pipe line of the train.

Let us now assume that the telemetry unit 4 has been mounted on the coupler 5 of the last vehicle 3 of the train, that the angle cock of the hose 2 is shut off, and that one desires to connect the brake hose coupling 1 to the "glad hand" brake pipe hose coupling 17. It is simply necessary to grasp and squeeze the pivotal lever 20 and the handle 18 to compress the helical spring 23. The locking lever 20 pivots about pin 22 so that the locking tab 26 is rotated clockwise to an open position and is lifted upward out of abutting relationship with the upper edge of the guard arm flange 15 of coupling 17. Next, the locking flanges 13 and 16 as well as locking flanges 14 and 15 are initially aligned with each other, and then the couplings 1 and 17 are manually rotated relative to each other until the fully coupled position is reached. At the fully coupled position, the handle 18 and lever 20 may be released so that the locking tab 26 contacts and mates with the rib face 27 to lock the couplings together. At the same time, the valve 31 which was opened by the spiral compression spring 34 is closed by the plunger 35, which is depressed by the locking lever 20. It will be seen that the mating surface of the portion 12 of gasket 11 matches the mating surface of the gasket of the "glad hand" brake pipe hose coupling so that a substantially air-tight connection results. Now the angle cock leading to the air hose 2 may be opened so that the air brake pressure in the brake line of the train may be continuously measured and monitored by the telemetry unit 4.

Now, if it is desired to remove the telemetry unit 4, the angle cock leading to the brake hose 2 is closed and the lever and handle are depressed. In addition to unlocking the coupling, the clockwise rotation of lever 20 permits the spring 34 to unseat and open the pressure relief valve 31 so that air pressure in hoses 2 and 39, and couplings 1 and 17 is rapidly purged or vented to atmosphere through the open passageway 30.

Now the couplings 1 and 17 may be safely broken or disconnected by relative rotation to each other, and the telemetry unit 4 may be easily removed from the coupler 5.

Thus, the present invention has been described in such full, clear, concise and exact terms as to enable any person skilled in the art to which it pertains to make and use the same. Having set forth the best mode contemplated of carrying out this invention, I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. An improved brake hose coupling for connection to a conventional brake pipe hose coupling comprising, a body member having a cavity, said cavity having an opening for receiving a sealing gasket, a threaded opening for receiving an end of an air hose which supplies air pressure to telemetry equipment, said body member having a through passage leading from said cavity to atmosphere, a bleed-off valve interposed in said through passage, said body member having an elongated handle portion and an upstanding stanchion, a pivoted locking member carried by said upstanding stanchion of said body member and being spring biased toward a locked position in which said pivoted locking member is latched to the conventional brake pipe hose coupling, and said pivoted locking member adapted to cause said bleed-off valve to vent the air pressure to atmosphere when said pivoted locking member and said elongated handle portion are grasped and squeezed together so that said pivoted locking member is moved to an unlocked position.

2. The improved brake hose coupling, as defined in claim 1, wherein said body member includes locking flanges which interlock with locking flanges of the conventional brake pipe hose coupling.

3. The improved brake hose coupling, as defined in claim 1, wherein said pivotal locking member includes an intermediate pivot pin and a pair of elongated arms extending on opposite sides of said pivot pin.

4. The improved brake hose coupling, as defined in claim 3, wherein one of said pair of elongated arms is spring-biased by a compression spring toward the locked position.

5. The improved brake hose coupling, as defined in claim 4, wherein said elongated handle portion is positioned beneath said one of said pair of elongated arms so that said pivotal locking member may be manually rotated about said intermediate pivot pin.

6. The improved brake hose coupling, as defined in claim 5, wherein the rotational movement of said pivoted locking member permits the unseating of said bleed-off valve by said spiral spring.

7. The improved brake hose coupling, as defined in claim 3, wherein the other of said pair of elongated arms includes a lock tab formed of the extreme end thereof.

8. The improved brake hose coupling, as defined in claim 7, wherein said lock tab is slotted to pass over a raised rib portion formed on a conventional brake pipe hose coupling.

9. The improved brake hose coupling, as defined in claim 3, wherein the other of said pair of elongated arms cooperates with a plunger of said bleed-off valve.

10. The improved brake hose coupling, as defined in claim 9, wherein a spiral spring biases said bleed-off valve toward an open position.

* * * * *